United States Patent
Tehrani et al.

(10) Patent No.: US 11,634,620 B2
(45) Date of Patent: Apr. 25, 2023

(54) METHOD FOR REDUCING THE RHEOLOGY OF HIGH INTERNAL-PHASE-RATIO EMULSION WELLBORE FLUIDS

(71) Applicants: M-I DRILLING FLUIDS U.K. LIMITED, Aberdeen (GB); SCHLUMBERGER TECHNOLOGY CORPORATION, Sugar Land, TX (US)

(72) Inventors: Mostafa A. Tehrani, Kincardineshire (GB); Louise Bailey, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1161 days.

(21) Appl. No.: 15/520,725

(22) PCT Filed: Apr. 29, 2014

(86) PCT No.: PCT/US2014/035899
§ 371 (c)(1),
(2) Date: Apr. 20, 2017

(87) PCT Pub. No.: WO2014/179330
PCT Pub. Date: Nov. 6, 2014

(65) Prior Publication Data
US 2017/0260440 A1 Sep. 14, 2017

Related U.S. Application Data

(60) Provisional application No. 61/819,360, filed on May 3, 2013.

(51) Int. Cl.
C09K 8/36 (2006.01)
C09K 8/56 (2006.01)
E21B 21/00 (2006.01)

(52) U.S. Cl.
CPC ............. *C09K 8/36* (2013.01); *C09K 8/56* (2013.01); *E21B 21/00* (2013.01)

(58) Field of Classification Search
CPC ............. C09K 8/36; C09K 8/56; E21B 21/00
See application file for complete search history.

(56) References Cited

U.S. PATENT DOCUMENTS

| 4,359,391 | A | * | 11/1982 | Salathiel | ............... C09K 8/36 166/271 |
| 5,189,012 | A | | 2/1993 | Patel et al. | |
| 7,651,983 | B2 | | 1/2010 | Massam et al. | |

(Continued)

OTHER PUBLICATIONS

Darley, et al., "Composition and Properties of Drilling and Completion Fluids," 5th Edition, Gulf Publishing Company, 1988, pp. 328-332.

(Continued)

*Primary Examiner* — Alicia Bland

(57) ABSTRACT

An invert emulsion fluid may include a oleaginous external phase, a nonoleaginous internal phase, wherein a ratio of the oleaginous external phase to nonoleaginous internal phase is less than 55:45, a emulsifier, a particulate weighting agent dispersed in the non-oleaginous internal phase, and a viscosifier stabilizing the dispersion of the particulate weighting agent in the non-oleaginous internal phase.

26 Claims, 5 Drawing Sheets

(56) References Cited

U.S. PATENT DOCUMENTS

| | | |
|---|---|---|
| 8,252,729 B2 | 8/2012 | Zhang |
| 2008/0009422 A1* | 1/2008 | Patel .................. C09K 8/035 |
| | | 507/110 |
| 2008/0194433 A1* | 8/2008 | Tehrani ................ C09K 8/36 |
| | | 507/219 |
| 2009/0258799 A1 | 10/2009 | Hodder et al. |
| 2010/0009874 A1* | 1/2010 | Ballard ................ C09K 8/03 |
| | | 507/118 |
| 2012/0067575 A1* | 3/2012 | Luyster ................ C09K 8/36 |
| | | 166/278 |

OTHER PUBLICATIONS

International Search Report and Written Opinion for the counterpart International patent application PCT/US2014/035899 dated Sep. 26, 2014.

Examination Report for the counterpart UK patent application 1519537.3 dated Nov. 21, 2019.

Search Report issued in Norwegian Patent Application No. 20151499 dated Jun. 21, 2022, 4 pages.

\* cited by examiner

METHOD FOR REDUCING THE RHEOLOGY OF HIGH INTERNAL-PHASE-RATIO EMULSION WELLBORE FLUIDS

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

Many types of fluids have been used in well bores particularly in connection with the drilling of oil and gas wells. The selection of an oil-based well bore fluid involves a careful balance of both the good and bad characteristics of such fluids in a particular application. The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil-based mud can be justified.

Oil-based drilling fluids are generally used in the form of invert emulsion muds. The components of the invert emulsion fluids include an oleaginous liquid such as hydrocarbon oil which serves as a continuous phase, a non-oleaginous liquid such as water or brine solution which serves as a discontinuous phase, and an emulsifying agent. The oil/water ratio of invert emulsion fluids is traditionally within the range of 65/45 to 85/15. As used herein, emulsifying agent and surfactant are used interchangeably. The emulsifying agent serves to lower the interfacial tension of the liquids so that the non-oleaginous liquid may form a stable dispersion of fine droplets in the oleaginous liquid. A full description of such invert emulsions may be found in *Composition and Properties of Drilling and Completion Fluids,* 5th Edition, H. C. H. Darley, George R. Gray, Gulf Publishing Company, 1988, pp. 328-332, the contents of which are hereby incorporated by reference. Additionally, such invert emulsion muds generally contain one or more weighting agents, surfactants, viscosifiers, fluid loss control agents or bridging agents.

The drawback to use of invert emulsion fluids is their cost (due to the oil content) and environmental concerns associated with waste and disposal (greater oil percentage may be correlated to more oil retention on drilled cuttings). However, as the oil to water ratio decreases (increased internal water phase), the viscosity of the fluid often increases beyond a workable range. Additionally, it also becomes more difficult to stabilize an invert emulsion (water-in-oil) as the water content increases. Accordingly, there exists a continuing need for invert emulsion wellbore fluids where the internal phase is present in amount greater than the external oleaginous fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an invert emulsion fluid including a oleaginous external phase, a non-oleaginous internal phase, wherein a ratio of the oleaginous external phase to non-oleaginous internal phase is less than 55:45, a emulsifier, a particulate weighting agent dispersed in the non-oleaginous internal phase, and a viscosifier stabilizing the dispersion of the particulate weighting agent in the non-oleaginous internal phase.

In another aspect, embodiments disclosed herein relate to an invert emulsion fluid including a oleaginous external phase, a non-oleaginous internal phase, wherein a ratio of the oleaginous external phase to non-oleaginous internal phase is less than 55:45, and a emulsifier stabilizing the oleaginous external phase and the non-oleaginous internal phase, wherein an average diameter of the non-oleaginous internal phase ranges from about 20-30 micrometers.

In yet another aspect, embodiments disclosed herein relate to a method of making a high internal phase ratio invert emulsion fluid. The method may include: viscosifying a non-oleaginous phase with a viscosifier, dispersing a weighting agent in the viscosified non-oleaginous phase, and dispersing the viscosified and weighted non-oleaginous phase into an oleaginous phase with an invert emulsifier, wherein a ratio of the oleaginous external phase and non-oleaginous internal phase is less than 55:45.

In yet another aspect, embodiments disclosed herein relate to a method of performing wellbore operations. The method may include: circulating a fluid in a wellbore, the fluid comprising a oleaginous external phase, a non-oleaginous internal phase wherein a ratio of the oleaginous external phase to non-oleaginous internal phase is less than 45:55, a emulsifier, a particulate weighting agent dispersed in the non-oleaginous internal phase and a viscosifier stabilizing the dispersion of the weighting agent in the non-oleaginous internal phase.

Other aspects and advantages will be apparent from the following description and the appended claims.

DETAILED DESCRIPTION

Figure 1:
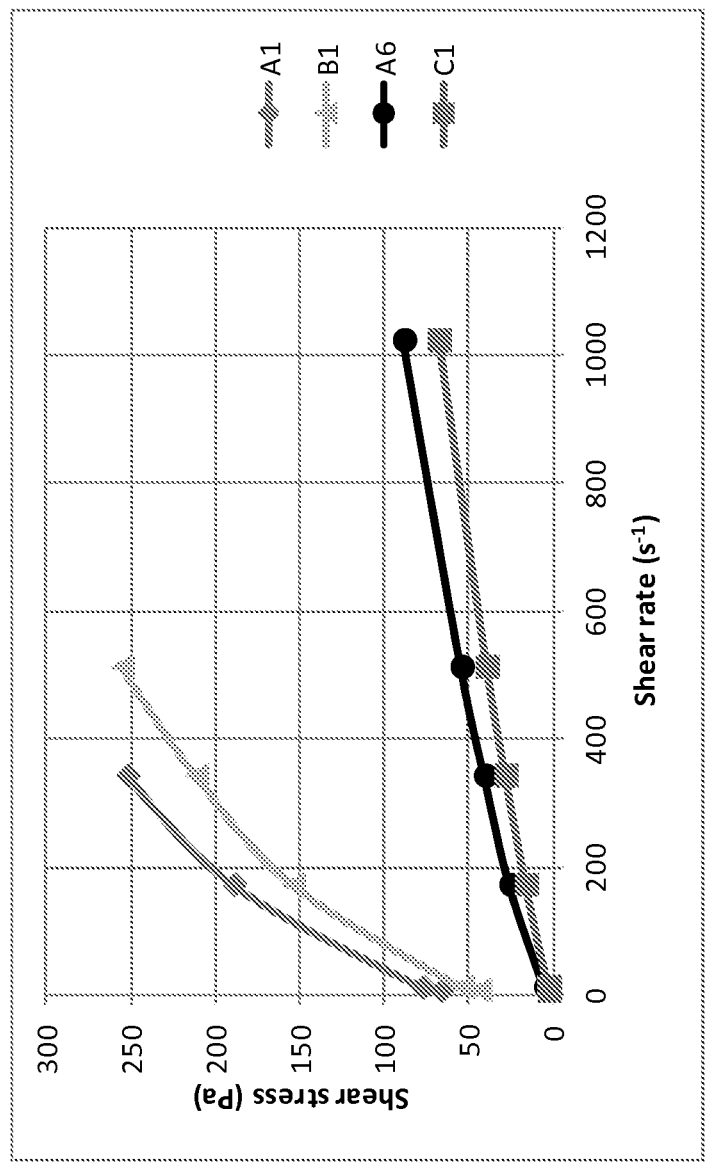
FIG. 1 shows the rheology of fluids of Example 1 at 120° F.

In one aspect, embodiments disclosed herein relate to invert emulsion fluids. As discussed above, an invert emulsion is a water-in-oil emulsion, where an oleaginous fluid serves as a continuous phase and a non-oleaginous fluid serves as a discontinuous phase, the non-oleaginous fluid being stabilized or emulsed in the oleaginous fluid by an emulsifying agent. However, particular embodiments disclosed herein relate to invert emulsion fluids having an oil/water ratio of less than 55/45, which may also be referred to as high internal phase ratio (HIPR) invert emulsions or high internal phase emulsions (HIPE). Further, according to one or more aspects, the high internal phase ratio fluids may be prepared so that a solid particulate weighting agent is dispersed in the internal non-oleaginous phase instead of the external oleaginous phase. In one or more embodiments, the non-oleaginous phase may include a viscosified aqueous phase in which the particulate solids are dispersed.

The oil/water ratio in invert emulsion fluids conventionally used in the field is in the range of 65/45 to 85/15. Several factors have conventionally dictated such ranges, including: the concentration of solids in the mud to provide the desired mud weight (solids laden muds must have a high O/W ratio to keep the solids oil wet and dispersed) and the high viscosities often experienced upon increase of the internal aqueous phase (due to the greater concentration of the dispersed internal phase).

The instability of the emulsions may be explained by examining the principles of colloid chemistry. The stability of a colloidal dispersion (emulsion for a liquid-liquid dispersion) is determined by the behavior of the surface of the particle via its surface charge and short-range attractive van der Waals forces. Electrostatic repulsion prevents dispersed particles from combining into their most thermodynamically stable state of aggregration into the macroscopic form, thus rendering the dispersions metastable. Emulsions are metastable systems for which phase separation of the oil and water phases represents the most stable thermodynamic state due to the addition of a surfactant to reduce the interfacial energy between oil and water.

Oil-in-water emulsions are typically stabilized by both electrostatic stabilization (electric double layer between the two phases) and steric stabilization (van der Waals repulsive forces), whereas invert emulsions (water-in-oil) are typically stabilized by only steric stabilization. Because only one mechanism can be used to stabilize an invert emulsion, invert emulsions are generally more difficult to stabilize, particularly at higher levels of the internal phase, and often experience highly viscous fluids.

Thus, embodiments of the present disclosure relate to invert emulsion fluids having a high internal phase concentration (<55/45 O/W), which have a viscosifier stabilizing a dispersion of a particulate weighting agent in the non-oleaginous phase and exhibit a significant reduction is viscosity compared to dispersing the weighting agent in the oleaginous phase.

As discussed above, as the internal aqueous phase of a given fluid system increases, the viscosity and rheological profile of the fluid also increases due to the greater concentration of the dispersed internal phase. However, the invert emulsion fluids of the present disclosure may possess rheological profiles more similar to fluids having a lower internal phase concentration, i.e., >50/50 O/W. In particular, in accordance with embodiments of the present disclosure, the fluids may possess a 90% reduction in rheology, measured as shear stress at 200 rpm, compared to a control fluid containing no viscosifier and having the particulate weighting agent dispersed in the conventional way in the oleaginous phase. (Measured at 120° C. using a Fann 35 Viscometer from the Fann Instrument Company, Houston, Tex.)

Further, the present disclosure also relates to fluids having a high internal phase ratio wherein the emulsion droplet size is larger as compared to conventional emulsion droplets. For example, the non-oleaginous phase distributed in the oleaginous phase may have an average diameter in the range of about 1 to 30 microns in one embodiment, and in the range of about 20 to 30 microns in a more particular embodiment. In one or more embodiments, the droplet size distribution may generally range such that at least 90% of the diameters are within 20% (or within 10%, in more particular embodiments) of the average diameter. In other embodiments, there may be a multimodal distribution. This droplet size may be approximately four to six times the size of emulsion droplets formed using conventional emulsifiers (e.g. amidoamines, fatty acids, etc) and with the particulate weighting agent dispersed in the conventional way in the oleaginous phase.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof In a particular embodiment, the fluids may be formulated using diesel oil or a synthetic oil as the external phase. The concentration of the oleaginous fluid should be sufficient so that an invert emulsion forms and may be less than about 55% by volume of the invert emulsion. In one embodiment the amount of oleaginous fluid is from about 55% to about 20% by volume and more preferably about 40% to about 20% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of the non-oleaginous fluid is typically less than the theoretical limit needed for forming an invert emulsion. Thus in one embodiment the amount of non-oleaginous fluid is more than about 50% by volume and preferably from about 50% to about 80% by volume. In another embodiment, the non-oleaginous fluid is preferably from about 60% to about 80% by volume of the invert emulsion fluid.

One example of an emulsifying agent that may stabilize the emulsion of the aqueous or non-oleaginous fluid within the oleaginous fluid, where the non-oleaginous fluid is present in a volume amount that is more than the non-oleaginous fluid, is an alkoxylated ether acid. In embodiment of an alkoxylated ether acid is an alkoxylated fatty alcohol terminated with an carboxylic acid, represented by the following formula:

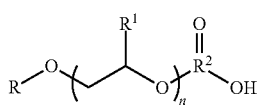

where R is $C_6$-$C_{24}$ or —C(O)$R^3$ (where $R^3$ is $C_{10}$-$C_{22}$), $R^1$ is H or $C_1$-$C_4$, $R^2$ is $C_1$-$C_5$ and n may range from 1 to 20. Such compound may be formed by the reaction of an alcohol with a polyether (such as poly(ethylene oxide), polypropylene oxide), poly(butylene oxide), or copolymers of ethylene oxide, propylene oxide, and/or butylene oxide) to form an alkoxylated alcohol. The alkoxylated alcohol may then be reacted with an α-halocarboxylic acid (such as chloroacetic acid, chloropropionic acid, etc.) to form the alkoxylated ether acid. In a particular embodiment, the selection of n may be based on the lipophilicity of the compound and the type of polyether used in the alkoxylation. In some particular embodiments, where $R^1$ is H (formed from reaction with poly(ethylene oxide)), n may be 2 to 10 (between 2 and 5 in some embodiments and between 2 and 4 in more particular embodiments). In other particular embodiments, where $R^1$ is —CH$_3$, n may range up to 20 (and up to 15 in other embodiments). Further, selection of R (or $R^3$) and $R^2$ may also depend on based on the hydrophilicity of the compound due to the extent of polyetherification (i.e., number of n). In selecting each R (or $R^3$), $R^1$, $R^2$, and n, the relative hydrophilicity and lipophilicity contributed by each selection may be considered so that the desired HLB value may be achieved. Further, while this emulsifier may be particularly suitable for use in creating a fluid having a greater than 50% non-oleaginous internal phase, embodiments of the present disclosure may also include invert emulsion fluids formed with such emulsifier at lower internal phase amounts.

One example of a commercially available emulsifying agent that may stabilize the emulsion of the aqueous or non-oleaginous fluid within the oleaginous fluid, where the non-oleaginous fluid is present in a volume amount that is more than the non-oleaginous fluid, is MUL XT® manufactured and distributed by M-I L.L.C. (Houston, Tex.). In particular embodiments, the emulsifier may be used in an amount ranging from 1 to 15 pounds per barrel, and from 2 to 10 pounds per barrel, in other particular embodiments.

In addition to the emulsifying agent that stabilizes the oleaginous continuous phase and non-oleaginous discontinuous phase, the wellbore fluids may also include, for example, weighting agents, dispersed in the non-oleaginous phase.

Weighting agents or density materials (other than the inherent weight provided by the internal aqueous phase) suitable for use in the fluids disclosed herein may include barite, galena, hematite, magnetite, iron oxides, illmenite, siderite, celestite, dolomite, calcite, and the like. The quantity of such material added, if any, depends upon the desired density of the final composition. Typically, weighting material may be added to result in a fluid density of up to about 24 pounds per gallon (but up to 21 pounds per gallon or up to 19 pounds per gallon in other particular embodiments). Additionally, it is also within the scope of the present disclosure that the fluid may be at least partially weighted up using salts (such as in the non-oleaginous fluid discussed above), but having solid weighting agents therein as well. One having ordinary skill in the art would recognize that selection of a particular material may depend largely on the density of the material as typically, the lowest wellbore fluid viscosity at any particular density is obtained by using the highest density particles.

In more particular embodiments barite may be used as the particulate weighting agent. The barite particulate weighting agents may be of any particle size (and particle size distribution). In one embodiment the barite particulate weighting agent may have a $D_{90}$ less than about 70 micrometers. In a more particular embodiment the barite particulate weighting agent may have a $D_{90}$ less than about 35 micrometers, or less than about 20 micrometers in yet another embodiment. Some embodiments may include barite particulate weighting agents having a smaller particle size range than API grade weighting agents, which may generally be referred to as micronized weighting agents. Such weighting agents may generally be in the micron (or smaller) range, including submicron particles in the nanosized range.

In some embodiments, the average particle size (d50, the size at which 50% of the particles are smaller) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Pat. No. 2010/009874, which is assigned to the present assignee and herein incorporated by reference. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In some embodiments, the weighting agents include dispersed solid colloidal particles with a weight average particle diameter (d50) of less than 10 microns that are coated with a hydrophilic, polymeric deflocculating agent or dispersing agent. In other embodiments, the weighting agents include dispersed solid colloidal particles with a weight average particle diameter (d50) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the interparticle interactions and thus will produce lower rheological profiles. It is the combination of fine particle size and control of colloidal interactions that reconciles the two objectives of lower viscosity and minimal sag.

In some embodiments, the weighting agents may be uncoated. In other embodiments, the weighting agents may be coated with a hydrophilic coating such as a water soluble polymer of molecular weight of at least 2000 Daltons may be used in a particular embodiment. Examples of such water soluble polymers may include a homopolymer or copolymer of any monomer selected from acrylic acid, alkyl acrylates, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate or salts thereof.

Viscosifiers may also be included in the wellbore fluid to viscosify the non-oleaginous internal phase. Viscosifiers which may be included are water- or brine-soluble or dispersible viscosifiers including both polymeric and clay-based viscosifiers. The polymeric viscosifiers may include synthetic polymers and/or biopolymers such as hydroxyethylcellulose (HEC), carboxymethyl cellulose, guar gum, xanthan gum diutan, scleroglucan gum and wellan gum, starches, polyamide resin, polyacrylates, polyacrylamides, and mixtures and derivatives thereof In a particular embodiment the biopolymer may be BIOVIS® manufactured and distributed by M-I L.L.C. (Houston, Tex.). Clay-based viscosifiers which may be used comprise clay materials containing attapulgite or sepiolite clays. The amount of viscosifier used in the composition may vary upon the end use of the composition, but may range from 0.1 to 10 wt %, or from 0.2 to 6 wt %, or from 0.5 to 1.5 wt % in other embodiments.

Other additives that may be included in the wellbore fluids disclosed herein include for example, fluid loss control additives, wetting agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. FAZE-WET™, VERSA-COAT™, SUREWET™, VERSAWET™, and VERSAWET™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Additionally, lime or other alkaline materials typically added to conventional invert emulsion drilling fluids and muds to maintain a reserve alkalinity may also be included in the present fluids.

Where a conventional invert emulsion is prepared by mixing a base oil and surfactant together and then adding the remaining components sequentially, the present fluids may be mixed in a different sequence to arrive at a different make-up of the internal and external phase. According to one or more embodiments, the invert emulsion of the present disclosure may be formed by adding an oleaginous fluid mixed with a surfactant to a weighted (with solid particulates), and optionally viscosified non-oleaginous fluid so that the solid particulates are dispersed in the internal non-oleaginous phase.

For example, in one or more embodiments, the invert emulsion wellbore fluid disclosed herein may be prepared by optionally viscosifying a suitable non-oleaginous fluid with a suitable viscosifier. A suitable particulate weighting agent may then be added to the optionally viscosified non-oleaginous fluid to create an optionally viscosified and weighted non-oleaginous fluid, thereafter, the optionally viscosified and weighted non-oleaginous fluid can be added to the oleaginous part of the drilling fluid and dispersed with a suitable emulsifier. An invert emulsion may be formed by vigorously agitating, mixing, or shearing the oleaginous fluid and the optionally viscosified and weighted non-oleaginous fluid. Other additives such as fluid loss control additives, lime, etc., may also be added as needed for the specific drilling application.

The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

In various embodiments, methods of drilling a subterranean hole with an invert emulsion drilling fluid may comprise mixing an oleaginous fluid, a non-oleaginous fluid, an emulsifier, such as those described above, and in the ratios described above, to form an invert emulsion; and drilling the subterranean hole using this invert emulsion as the drilling fluid. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling. One skilled in the art would recognize that oil-based drilling muds may be prepared with a large variety of formulations. Specific formulations may depend on the state of drilling a well at a particular time, for example, depending on the depth and/or the composition of the formation.

EXAMPLES

The following examples were used to test the stability and rheological properties of a high internal phase ratio invert emulsion, such as those described in the present disclosure. In the examples that follow, all test fluids were based on the oil-based drilling fluid formulation of Table 1. In the examples, products were added in the order shown in the table (from top to bottom) unless otherwise stated. Mixing was achieved on a Hamilton Beach blender set at medium speed. Total mixing time was one hour. All fluids were formulated to produce a density of 12.0 lb/gal (1.445 SG) and an oil-water ratio of 34/66.

TABLE 1

Oil-based drilling fluid formulation

| Product | Function | lb/bbl |
|---|---|---|
| DF-1 | Base Oil | 71.6 |
| MULXT | Emulsifier | 10.0 |
| SUREWET | Wetting Agent | 2.0 |
| Lime | Alkalinity Control | 8.0 |
| ECOTROL RD | Fluid Loss Control | 0.5 |
| Calcium Chloride Brine (85%) | Internal Phase | 259.0 |
| Fine-Grind Barite | Weight Material | 154.8 |
| Fluid Density | | 1.445 |
| Oil/Water ratio | | 34/66 |

Example 1

Four fluids were prepared as follows: (A1) A control fluid referred to as the benchmark, prepared according to the formulation of Table 1. The fine grind barite was dispersed in the conventional way in the continuous oil phase; (A6) prepared the same as A1 except the brine phase was viscosified with a salt tolerant biopolymer, BIOVIS® prior to addition to the continuous oil phase; (B1) prepared the same as A1 except the barite was dispersed in the brine phase prior to addition to the continuous oil phase, also additional emulsifier (12 lb/bbl instead of 10 lb/bbl) was used in place of the wetting agent of A1; (C1) prepared the same as B1 except the brine phase was viscosified with salt tolerant biopolymer, BIOVIS®, before dispersing the barite in the brine phase. See Table 2 for a summary of said formulations, where E is MUL XT®, WA is SUREWET™ and BV1 is BIOVIS®, all of which are available from M-I SWACO (Houston, Tex.).

TABLE 2

Summary of fluids of Example 1

| Sample | Emulsifier & Wetting Agent (lb/bbl) | Brine Viscosifier (wt %) | Barite in |
|---|---|---|---|
| A1 | E (10), WA (2) | None | Oil |
| A6 | E (10), WA (2) | BV1 (1.0) | Oil |
| B1 | E (12) | None | Brine |
| C1 | E (12) | BV1 (1.0) | Brine |

Rheology of the fluids was measured at 120° F. on a Fann 35 viscometer over the rotational speed range 3-600 rpm, equivalent to 5.11-1022 $s^{-1}$ shear rates. The rheology profiles are shown in FIG. 1. Data show that the benchmark Fluid A1, prepared in the conventional way (i.e. barite in the oil phase), has significantly higher rheology than the other three fluids. Fluid A6 was the same as A1 except the brine phase was viscosified with a salt-tolerant biopolymer, BIOVIS® from M-I SWACO. It shows more than 80% reduction in rheology at 200 rpm (340 $s^{-1}$ shear rate). Fluid B1 was prepared with barite in the brine phase; it shows a 20% reduction in rheology at 200 rpm. However, a much greater reduction in rheology was obtained when the brine phase was viscosified with BIOVIS® before addition of barite; Fluid C1 shows a 90% reduction in rheology at 200 rpm.

The rheology and electrical stability values are shown in Table 3 below.

TABLE 3

Rheology and Electrical Stability Measurements

| Fluids | | A1 | | A6 | | C1 | |
|---|---|---|---|---|---|---|---|
| 600 RPM | lbs/100 ft² | os | os | 184 | 234 | 141 | 211 |
| 300 RPM | " | os | os | 113 | 156 | 82 | 135 |
| 200 RPM | " | 252 | 254 | 84 | 121 | 59 | 103 |
| 100 RPM | " | 189 | 191 | 53 | 80 | 34 | 66 |
| 6 RPM | " | 77 | 80 | 10 | 21 | 6 | 14 |
| 3 RPM | " | 66 | 68 | 7 | 16 | 5 | 11 |
| GELS 10" | " | 62 | 65 | 7 | 16 | 5 | 11 |
| GELS 10' | " | 59 | 57 | 9 | 16 | 5 | 11 |
| PLASTIC VISC. | cP | — | — | 71 | 78 | 59 | 76 |
| YIELD POINT | lbs/100 ft² | — | — | 42 | 78 | 23 | 59 |
| ELECTRIC STABILITY | VOLTS | 939 | 850 | 430 | 380 | 196 | 185 |

Example 2

All three fluids of this example contain barite in the brine phase. Fluids C6 and C7 were mixed in the same way as fluid C1 (of the previous example) but with different concentrations of brine viscosifier BIOVIS®. While C1 contained 1% (w/w) of the viscosifier in brine, Fluids C6 and C7 were mixed with 0.5% and 1.5%, respectively, of the viscosifier. A summary of the fluids is shown in Table 4.

TABLE 4

Summary of fluids of Example 2

| Sample | Emulsifier & Wetting Agent (lb/bbl) | Brine Viscosifier (wt %) | Barite in |
|---|---|---|---|
| C1 | E (12) | BV1 (1.0) | Brine |
| C6 | E (12) | BV1 (0.5) | Brine |
| C7 | E (12) | BV1 (1.5) | Brine |

Figure 2:
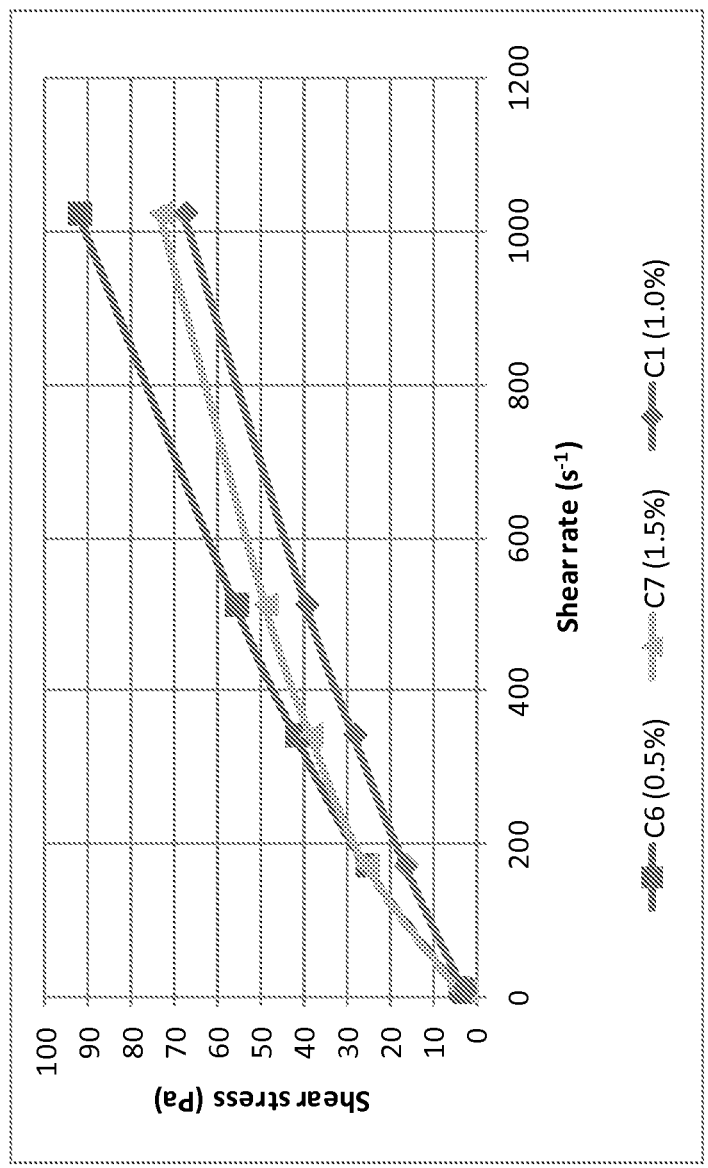
FIG. 2 shows the effect of biopolymer brine-viscosifier concentration on fluid rheology at 120° F., as described in Example 2.

The rheology data are shown in FIG. 2. The results show that the lowest rheology is obtained with 1.0% of BIOVIS in the brine; both the lower and the higher concentrations of the biopolymer viscosifier generated slightly higher rheology.

Example 3

This example compares the performance of the biopolymer brine viscosifier with a clay-based viscosifier (BV2). Fluids C10 and A7 are equivalents of C2 and A6, respectively, but with different brine viscosifiers. Table 5 gives a summary of the fluids in this example.

TABLE 5

Summary of fluids of Example 3

| Sample | Emulsifier & Wetting Agent (lb/bbl) | Brine Viscosifier (wt %) | Barite in |
|---|---|---|---|
| A6 | E (10), WA (2) | BV1 (1.0) | Oil |
| C2 | E (12) | BV1 (1.0) | Brine |
| A7 | E (10), WA (2) | BV2 (2.0) | Oil |
| C10 | E (12) | BV2 (2.0) | Brine |

Figure 3:
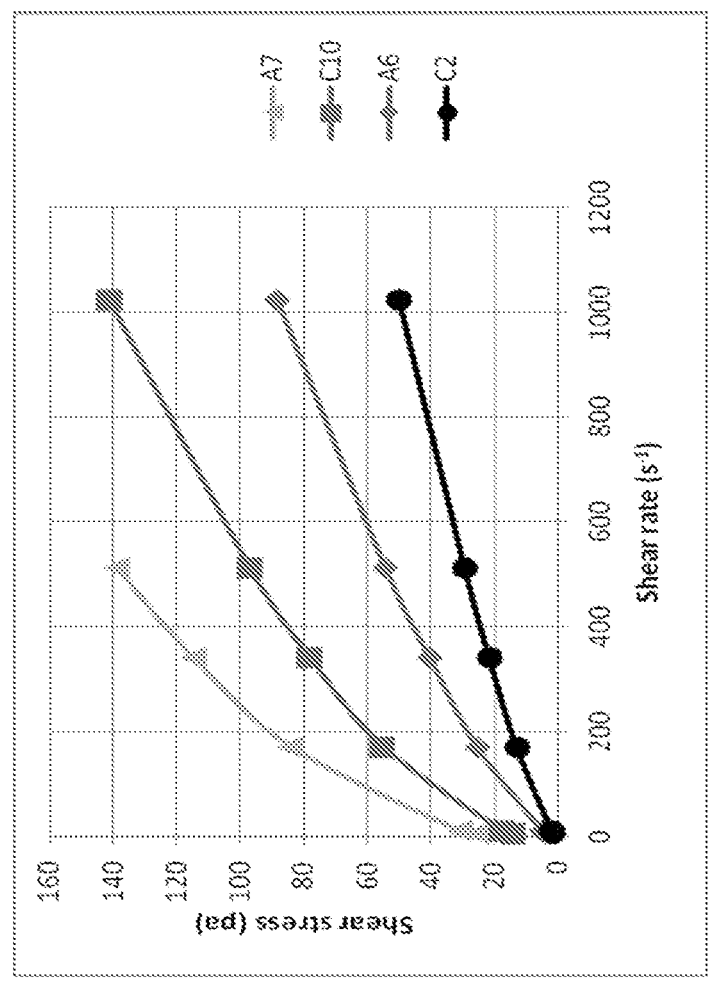
FIG. 3 shows a comparison of the effects of different brine viscosifiers on fluid rheology at 120° F., as described in Example 3.

FIG. 3 compares the rheology profiles of the four fluids. The results show that the biopolymer (Fluids A6 and C2) is more effective at reducing the rheology than the clay-based brine viscosifier (Fluids A7 and C10); irrespective of whether the barite is in the oil phase or in the brine.

Example 4

The fluids in this example demonstrate the effect of clay brine-viscosifier concentration on fluid rheology. A summary of the fluids is shown in Table 6.

TABLE 6

Summary of fluids in Example 4

| Sample | Emulsifier & Wetting Agent (lb/bbl) | Brine Viscosifier (wt %) | Barite in |
|---|---|---|---|
| A1 | E (10), WA (2) | None | Oil |
| C11 | E (12) | BV2 (1) | Brine |
| C10 | E (12) | BV2 (2) | Brine |
| C12 | E (12) | BV2 (4) | Brine |

Figure 4:
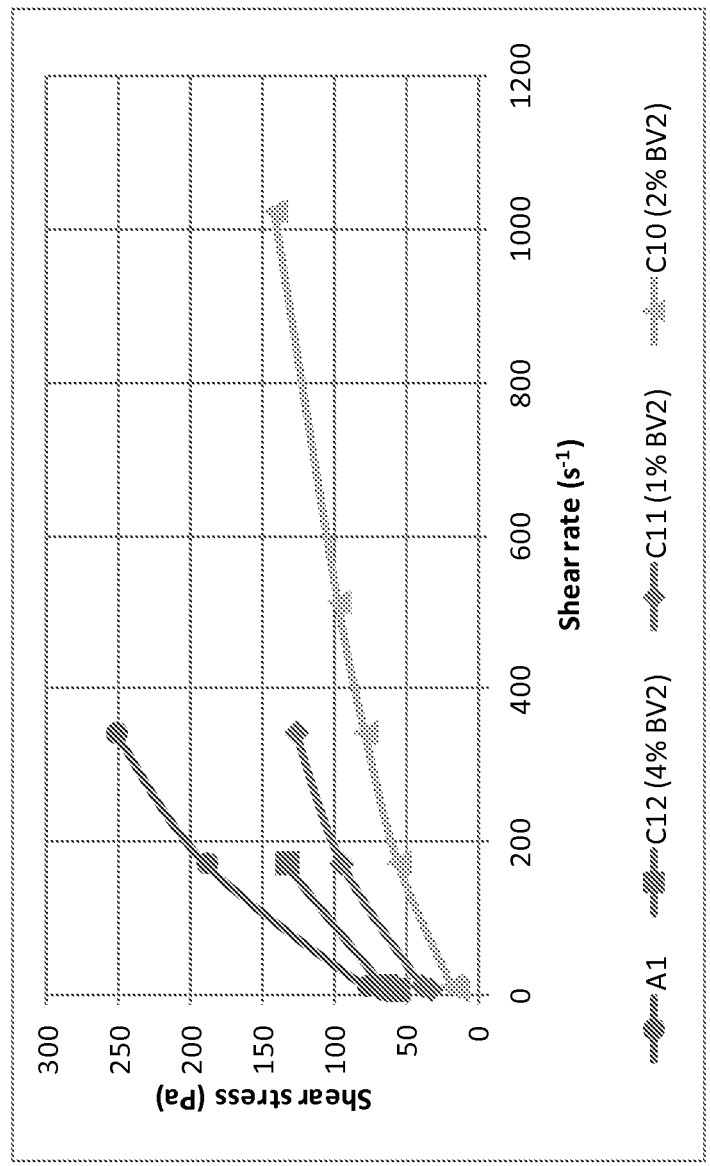
FIG. 4 shows the effect of clay-based brine viscosifier concentration on fluid rheology at 120° F., as described in Example 4.

FIG. 4 shows that 2% clay viscosifier in the brine phase gives the lowest fluid rheology. Lower and higher concentrations are not as effective in reducing the rheology. Compared to the benchmark (Fluid A1), 2% clay in the brine phase of Fluid C10 gives a 70% reduction in rheology at 200 rpm.

Example 5

In this example, the fluids were hot rolled for 16 hours at 250° F. (121° C.). The fluids were: A1, A6 and C1. A summary of the fluids is given in Table 7.

TABLE 7

Summary of fluids in Example 5

| Sample | Emulsifier & Wetting Agent (lb/bbl) | Brine Viscosifier (wt %) | Barite in |
|---|---|---|---|
| A1 AHR | E (10), WA (2) | None | Oil |
| A6 AHR | E (10), WA (2) | BV1 (1) | Oil |
| C1 AHR | E (12) | BV1 (1) | Brine |

Figure 5:
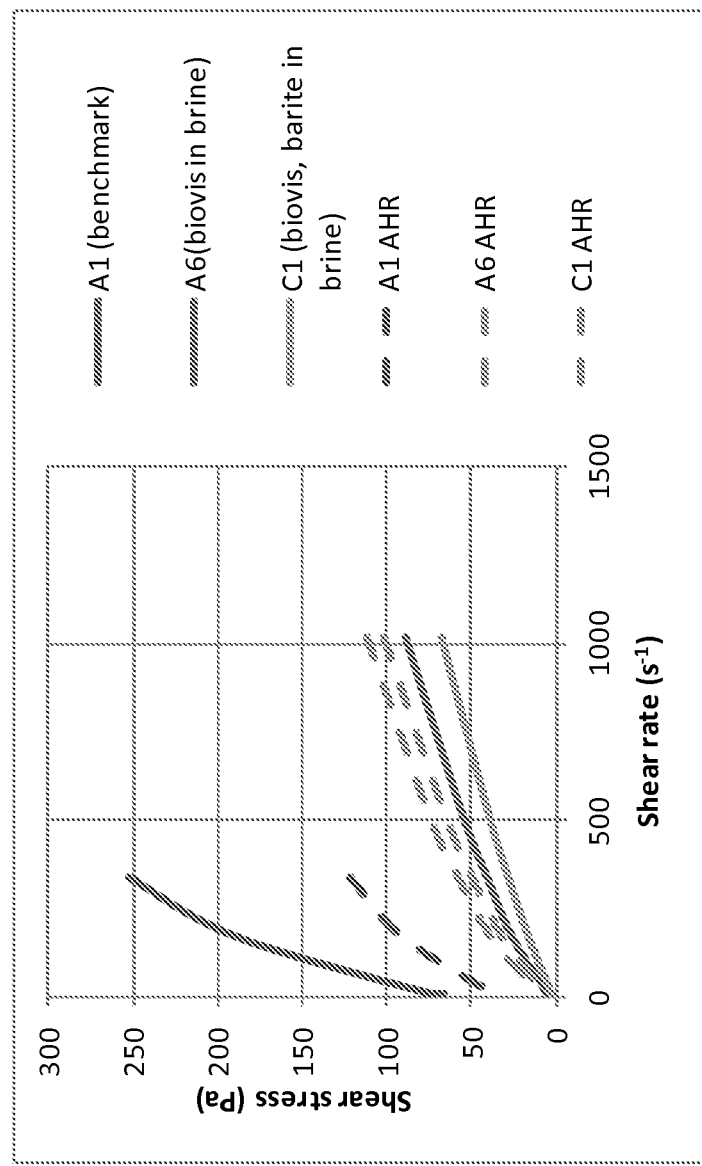
FIG. 5 shows the rheology of fluids of Example 5 before and after hot rolling for 16 hours at 250° F.

Fluid rheology was measured both before and after hot rolling. The results are shown in FIG. 5. The solid lines represent rheology before hot rolling while the broken lines belong to rheology data after hot rolling.

It is clear that while the gap between A1 and C1 decreases after hot rolling, there is still a significant decrease in rheology of the hot-rolled benchmark (A1 AHR) compared to the hot rolled fluid with barite in viscosified brine (C1 AHR). The results suggest a 60% decrease in rheology at 200 rpm (340 s$^{-1}$ shear rate).

Embodiments of the present disclosure may provide invert emulsion fluids having a high internal phase concentration (<55/45 O/W) with rheology practical for use in the field. The internal phase may contain viscosifier stabilized particulate weighting agents and a concomitant increase in internal phase droplet size. High internal phase invert emulsion fluids of the present disclosure may provide for reduced cost due to the low oleaginous content of the fluids relative to conventional invert emulsion fluids. Further, the low oleaginous content decreases the expenses related to the high cost for the oleaginous phase content in the fluid along with the disposal of the fluid, and any materials it encounters, relative to non-oleaginous fluids.

Although only a few example embodiments have been described in detail above, those skilled in the art will readily appreciate that many modifications are possible in the example embodiments without materially departing from Method for Reducing the Rheology of High Internal-Phase-Ratio Emulsion Wellbore Fluids. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. An invert emulsion fluid, comprising:
   an oleaginous external phase;
   a non-oleaginous internal phase, wherein a ratio of the oleaginous external phase to non-oleaginous internal phase is less than 55:45;
   an emulsifier selected from an alkoxylated ether acid;
   a dispersion of particulate weighting agent in the non-oleaginous internal phase; and
   a viscosifier stabilizing the dispersion of the particulate weighting agent in the non-oleaginous internal phase.

2. The invert emulsion fluid of claim 1, wherein the ratio of the oleaginous external phase to non-oleaginous internal phase is less than 40:60.

3. The invert emulsion fluid of claim 1, wherein the ratio of the oleaginous external phase to non-oleaginous internal phase is less than 30:70.

4. The invert emulsion fluid of claim 1, wherein the viscosifier comprises at least one of a clay-based viscosifier and a polymeric viscosifier.

5. The invert emulsion fluid of claim 4, wherein the polymeric viscosifier is present and comprises at least one of a synthetic polymer and a biopolymer.

6. The invert emulsion fluid of claim 1, wherein the particulate weighting agent comprises barite with a D90 of less than about 70 micrometers.

7. The invert emulsion fluid of claim 1, wherein the particulate weighting agent comprises barite with a D90 of less than about 35 micrometers.

8. The invert emulsion fluid of claim 1, wherein the particulate weighting agent comprises barite with a D90 of less than about 10 micrometers.

9. An invert emulsion fluid, comprising:
an oleaginous external phase;
a non-oleaginous internal phase, wherein a ratio of the oleaginous external phase and non-oleaginous internal phase is less than 55:45; and
an emulsifier stabilizing the oleaginous external phase and the non-oleaginous internal phase; and
a particulate weighting agent dispersed in the non-oleaginous internal phase;
wherein an average diameter of the non-oleaginous internal phase ranges from about 1-30 micrometers and a concentration of the emulsifier ranges from 1 to 15 pounds per barrel.

10. The invert emulsion fluid of claim 9, further comprising a viscosifier stabilizing the dispersion of the particulate weighting agent dispersed in the non-oleaginous phase.

11. The invert emulsion fluid of claim 9, wherein the ratio of the oleaginous external phase to non-oleaginous internal phase is less than 40:60.

12. The invert emulsion fluid of claim 9, wherein the ratio of the oleaginous external phase to non-oleaginous internal phase is less than 30:70.

13. The invert emulsion fluid of claim 10, wherein the viscosifier comprises at least one of a clay-based viscosifier and a polymeric viscosifier.

14. The invert emulsion fluid of claim 13, wherein the polymeric viscosifier is present and comprises at least one of a synthetic polymer and a biopolymer.

15. The invert emulsion fluid of claim 10, wherein the particulate weighting agent comprises barite with a D90 of less than about 70 micrometers.

16. The invert emulsion fluid of claim 10, wherein the particulate weighting agent comprises barite with a D90 of less than about 35 micrometers.

17. The invert emulsion fluid of claim 10, wherein the particulate weighting agent comprises barite with a D90 of less than about 10 micrometers.

18. A method of making a high internal phase ratio invert emulsion fluid, comprising:
viscosifying a non-oleaginous phase with a viscosifier;
dispersing a weighting agent in the viscosified non-oleaginous phase; and
dispersing the viscosified and weighted non-oleaginous phase into an oleaginous phase with an invert emulsifier, wherein a ratio of the oleaginous external phase and non-oleaginous internal phase is less than 55:45.

19. The method of making a high internal phase ratio invert emulsion fluid of claim 18, wherein the viscosifying and dispersing of the weighting agent occurs before dispersing the non-oleaginous phase into the oleaginous phase.

20. The method of making a high internal phase ratio invert emulsion fluid of claim 18, wherein the viscosifier comprises a clay-based viscosifier and/or a polymeric viscosifier.

21. The method of making a high internal phase ratio invert emulsion fluid of claim 20, wherein the polymeric viscosifier comprises synthetic polymer and/or a biopolymer.

22. The method of making a high internal phase ratio invert emulsion fluid of claim 18, wherein the ratio of the oleaginous external phase to non-oleaginous internal phase is less than 40:60.

23. The method of making a high internal phase ratio invert emulsion fluid of claim 18, wherein the ratio of the oleaginous external phase to non-oleaginous internal phase is less than 30:70.

24. The method of making a high internal phase ratio invert emulsion fluid of claim 18, further comprising hot rolling.

25. A method of performing wellbore operations, comprising:
circulating the invert emulsion fluid according to claim 9 in a wellbore.

26. The method of performing wellbore operations of claim 25, wherein the circulating the invert emulsion fluid in the wellbore occurs during any of drilling, completion, or gravel packing the wellbore.

* * * * *